(12) United States Patent
Madsen et al.

(10) Patent No.: US 12,239,940 B2
(45) Date of Patent: Mar. 4, 2025

(54) OSMOTIC SOLUTION MINING

(71) Applicant: SALTPOWER HOLDING APS, Sønderborg (DK)

(72) Inventors: Henrik Tækker Madsen, Copenhagen (DK); Lars Storm Pedersen, Farum (DK)

(73) Assignee: SALTPOWER HOLDING APS (DK)

( * ) Notice: Subject to any disclaimer, the term of this patent is extended or adjusted under 35 U.S.C. 154(b) by 130 days.

(21) Appl. No.: 17/799,333

(22) PCT Filed: Feb. 17, 2021

(86) PCT No.: PCT/EP2021/053915
§ 371 (c)(1),
(2) Date: Aug. 12, 2022

(87) PCT Pub. No.: WO2021/165337
PCT Pub. Date: Aug. 26, 2021

(65) Prior Publication Data
US 2023/0107529 A1    Apr. 6, 2023

(30) Foreign Application Priority Data

Feb. 17, 2020 (DK) .............................. PA202070092
May 26, 2020 (GB) ..................................... 2007806

(51) Int. Cl.
| | |
|---|---|
| *B01D 61/00* | (2006.01) |
| *B65G 5/00* | (2006.01) |
| *E21B 43/28* | (2006.01) |
| *F03G 7/00* | (2006.01) |

(52) U.S. Cl.
CPC ............. *B01D 61/002* (2013.01); *B65G 5/00* (2013.01); *E21B 43/28* (2013.01);
(Continued)

(58) Field of Classification Search
CPC ............ B01D 61/002; B01D 2313/246; B01D 2313/243; B01D 2311/25; B65G 5/00; E21B 43/28; F03G 7/015
See application file for complete search history.

(56) References Cited

U.S. PATENT DOCUMENTS

| | | | |
|---|---|---|---|
| 2010/0282656 A1 | 11/2010 | Cath et al. | |
| 2014/0138956 A1* | 5/2014 | Sano ....................... | F03B 13/00 290/54 |

(Continued)

FOREIGN PATENT DOCUMENTS

| | | |
|---|---|---|
| WO | 2017/149101 | 9/2017 |
| WO | 2019/011991 | 1/2019 |
| WO | 2019/011992 | 1/2019 |

OTHER PUBLICATIONS

Search Report from the Intellectual Property Office of the United Kingdom for Application No. GB2007806.9, mailed Nov. 18, 2020, 3 pages.

(Continued)

*Primary Examiner* — Carib A Oquendo
(74) *Attorney, Agent, or Firm* — Jackson Walker LLP; Christopher J. Rourk

(57) ABSTRACT

A process for solution mining of minerals is disclosed. The process comprises injecting an unsaturated stream (150) at an injection pressure into a mineral formation (130) to dissolve the mineral and extracting a high concentration stream (110) containing said dissolved mineral. The process comprising converting latent osmotic energy present in said high concentration stream into an increase in the total pressure of said stream by passage through an osmotic power unit (200) and generating electricity and reducing to the injection pressure the total pressure of a reduced concentration output stream (150) by passage through a power generating device (250) and using the reduced concentration (Continued)

output stream (150) at the injection pressure as the unsaturated stream (150). A process for storing a fuel in an underground formation is also disclosed.

17 Claims, 5 Drawing Sheets

(52) U.S. Cl.
CPC .. *B01D 2313/243* (2013.01); *B01D 2313/246* (2013.01); *F03G 7/015* (2021.08)

(56) References Cited

U.S. PATENT DOCUMENTS

| | | | | |
|---|---|---|---|---|
| 2016/0272513 | A1* | 9/2016 | Garbade | C02F 9/00 |
| 2018/0229184 | A1* | 8/2018 | Resendes | B01D 61/002 |
| 2019/0070560 | A1* | 3/2019 | Kennedy | C12M 21/04 |
| 2019/0093639 | A1* | 3/2019 | Nissen | F03G 7/005 |
| 2020/0158096 | A1* | 5/2020 | Madsen | F03G 7/015 |
| 2020/0255311 | A1* | 8/2020 | Nissen | C02F 11/04 |
| 2022/0339583 | A1* | 10/2022 | Warsinger | C02F 1/008 |
| 2023/0071602 | A1* | 3/2023 | Abbassi Monjezi | C02F 1/445 |
| 2023/0358204 | A1* | 11/2023 | Ayarturk | F03B 17/06 |
| 2024/0091706 | A1* | 3/2024 | Madsen | B01D 61/0022 |

OTHER PUBLICATIONS

Notification of Transmittal of the International Search Report and the Written Opinion of the International Search Authority—The European Patent Office—for International Application No. PCT/EP2021/053915 mailed May 14, 2021, 13 pages.

\* cited by examiner

OSMOTIC SOLUTION MINING

FIELD OF THE INVENTION

The present invention concerns solution mining. More particularly, but not exclusively, this invention concerns a process for solution mining of minerals (for example salts or potash) and a solution mining system suitable for use in such a process.

RELATED APPLICATIONS

The present application claims benefit of and priority to International Application No. PCT/EP2021/053915, filed Feb. 17, 2021, which claims priority to and benefit of United Kingdom Patent Application No. 2007806.9, filed May 26, 2020 and Denmark Patent Application No. PA202070092, filed Feb. 17, 2020, each of which is hereby incorporated by reference for all purposes, as if set forth herein in its entirety.

BACKGROUND OF THE INVENTION

One known method of natural gas storage is to create large caverns in underground salt formations, for example in underground salt dome or rock salt formations. These caverns are created by a process known as solution mining. Typically, solution mining involves injecting large amounts of (fresh) water down into an underground salt formation. The salt is then dissolved by that water, and the resulting highly saline or saturated brine is returned to the surface. Solution-mined cavities gradually shrink over time, and the solution mining process may be repeated periodically in order to maintain the cavity. It will be appreciated that solution mining has other applications in addition to the production of natural gas storage caverns. For example, solution mining may be used as a means of extracting water-soluble minerals for use in downstream industrial applications. It would be advantageous to provide a more efficient solution mining process.

WO 2017/149101 entitled Electricity Generation Process describes a process in which an aqueous feed stream is injected into a salt formation to dissolve the salt contained therein and then extracting a saline stream containing said dissolved salt. The latent osmotic energy present in said saline stream is converted into electricity by passage through an osmotic power unit in which the saline stream is passed over one side of a semi permeable membrane, a low concentration stream being passed over the other side of the membrane. An output stream derived from the low salinity stream is then used as the aqueous feed stream for dissolving the salt. The electricity generated in this way may be used in full or in part to operate the solution mining process by driving one or more pumps. In one embodiment, part of the output stream derived from the high concentration stream after passage through the osmotic power unit is mixed with the output stream derived from the low salinity stream and the resulting stream used as the aqueous feed stream for dissolving the salt. While the process of WO 2017/149101 increases the efficiency of the solution mining process it would be advantageous to provide a yet more efficient process.

WO 2019/011991 entitled Power Generation Process describes a process for generating power from a warm saline stream obtained from geothermal sources. Latent osmotic energy present in the stream is converted into an increase in the total pressure of said stream by passing through an osmotic pump unit in order to reduce the need for mechanical pumping in subsequent process steps. WO 2019/011991 discloses that the increased total pressure of the stream as a result of the work done by the osmotic pump unit may reduce the amount of work required to inject the stream underground and thereby increase the overall efficiency of the process. It would be advantageous to provide a more efficient process.

Additionally and/or alternatively, it would be advantageous to provide an improved solution mining process.

SUMMARY OF THE INVENTION

In a first aspect of the invention there is provided a process for solution mining of minerals, the process comprising one or more of the following steps:
  injecting an unsaturated stream at an injection pressure into a mineral formation to dissolve the mineral contained therein, and then extracting a high concentration stream containing said dissolved mineral from the mineral formation;
  converting latent osmotic energy present in said high concentration stream into an increase in the total pressure of said stream by passage through an osmotic power unit comprising a semi-permeable membrane which permits the passage of solvent but not the passage of the mineral, and in which the high concentration stream is passed over one side of the semi-permeable membrane, a low concentration stream being passed over the other side of said membrane;
  generating electricity and reducing to the injection pressure the total pressure of a reduced concentration output stream by passing the reduced concentration output stream through a power generating device, the reduced concentration output stream being derived from the high concentration stream after passage over the membrane; and
  using the reduced concentration output stream at the injection pressure as the unsaturated stream injected into the mineral formation.

Thus, it may be that the passage through the power generating device is used to reduce the pressure of the reduced concentration output stream until it is equal to the pressure required for injection into the mineral formation. In this way, the need to pump the reduced concentration output stream during injection into the mineral formation may be eliminated. It has been found that adjusting the amount of electricity generated by the turbine so that the total pressure of the reduced concentration output stream is the (total) injection pressure represents a particularly efficient way of operating an osmotic solution mining process. Additionally or alternatively, this may avoid the need for an injection pump to pressurise the unsaturated stream for injection, thereby simplifying systems for operating the process.

Total pressure ($p_0$) may be defined as:

$$p_o = p + q + \rho g h$$

Where p is the static pressure, q is the dynamic pressure, $\rho$ is the density of the fluid, g is acceleration due to gravity, and h is the height above a datum. The dynamic pressure may be defined as:

$$q = \frac{1}{2}\rho v^2$$

Where v is the velocity of the fluid. Thus, the total pressure of the high concentration stream immediately upstream of the semi-permeable membrane may be greater than the total pressure of the reduced concentration output stream immediately downstream of the semi-permeable membrane as a result of water flowing across the membrane from the low concentration stream to the high concentration stream. Similarly, the total pressure of the high concentration stream immediately upstream of the osmotic power unit may be greater than the total pressure of the reduced concentration output stream immediately downstream of the osmotic power unit as a result of water flowing across the membrane from the low concentration stream to the high concentration stream.

It will be appreciated that increasing the total pressure of the high concentration stream may give rise to a corresponding increase in the volumetric flow rate (i.e. the volume of liquid passing per unit time) and/or mass flow rate (i.e. the mass of a substance passing per unit time) of the stream. Thus, the volumetric flow rate and/or mass flow rate of the high concentration stream immediately upstream of the semi-permeable membrane may be less than the volumetric flow rate and/or mass flow rate of the reduced concentration output stream immediately downstream of the semi-permeable membrane.

It will be appreciated that the reduced concentration output stream may suffer minor pressure loss due to friction, pipe flow and other effects between leaving the osmotic power unit and being injected into the mineral formation. However such losses will be negligible as a percentage of the injection pressure. It will be appreciated that no work (for example mechanical pumping) is done on the reduced concentration output stream to increase the total pressure of the stream between output from the osmotic power unit and the head of the injection well.

The unsaturated stream may be injected into the mineral formation via an injection well. The injection pressure may be defined as the pressure at which the unsaturated stream is injected into the injection well via which the stream reaches the mineral formation. It will be appreciated that the injection pressure will depend upon various factors including the structure of the well, mineral formation and the desired flow rate. The terms high(er)-concentration and low(er)-concentration are used herein to refer to streams having a corresponding content of the mineral dissolved therein.

The process of the invention may use a solution mining process. The input to the solution mining process will be an unsaturated stream. It will be understood that the properties of the unsaturated stream must be such that mineral (solute) from a mineral formation will dissolve into the unsaturated stream. The unsaturated stream may comprise a solvent, for example water. The output of the solution mining process will be a high concentration stream containing the mineral (solute) dissolved from the mineral formation.

The process of the invention may use a high concentration stream obtained from a mineral formation in an osmotic power generation step. The high concentration stream is generally subject to any necessary pretreatment steps prior to carrying out the power generation step. For example, filtration to remove solid material may be necessary, as might other conventional processes depending on the exact nature of the stream.

The inputs to the osmotic power generation step are a low concentration stream, and a high concentration stream. As the two streams pass over the semi-permeable membrane solvent (for example water) from the low concentration stream will flow across the membrane into the high concentration stream, thereby increasing the total pressure of said stream. That is to say the latent osmotic energy present in the high concentration stream is transformed into an increase in total pressure by passage over the semi-permeable membrane. After passage over the membrane, the concentration of the high concentration stream will be reduced and the concentration of the low concentration stream will be increased.

After being output from the membrane, the total pressure of the reduced concentration stream is reduced by passage through a power generation device. The total pressure of the stream on output from the power generation device is equal to the injection pressure. The power generation device may be configured to transform pressure energy in the reduced concentration output stream into electricity. The power generation device may comprise a turbine, for example connected to a generator such that movement of the turbine causes movement of the generator thereby producing electricity. The power generation device may be configured such that the pressure drop across the device reduces the total pressure of the reduced concentration output stream to the injection pressure. The power generation device may be configured such that the pressure drop across the device can be varied, of example by a user or automatically, in response to one or more process parameters to allow the desired pressure drop to be achieved.

The osmotic power unit may comprise a pressure exchanger configured to transfer pressure from the reduced concentration output stream to the high concentration output stream prior to passage of the high concentration stream over the semi-permeable membrane. It may be that a first fraction of the reduced concentration output stream from the membrane is passed to the power generation device and a second fraction of the reduced concentration output stream from the membrane is passed to pressure exchanger. It may be that after passage through the pressure exchanger the second fraction of the reduced concentration output stream is output from the process, for example as an additional reduced concentration output stream. Use of a pressure exchanger may further increase the efficiency of the process.

It may be that the pressure of the high concentration stream is increased prior to passage over the membrane using a pump. It may be that the pump is driven by electricity generated using the energy generation device. Use of a pump to increase the pressure of the high concentration may increase the efficiency of the osmotic power generation process and/or allow all of the reduced concentration output stream to be reinjected into the mineral formation without further pumping.

The pressure of the high concentration stream may be increased within the osmotic power unit (for example using the pressure exchanger or pump) to a pressure less than the osmotic pressure of the stream.

The outputs from the osmotic power generation step are therefore a reduced concentration output stream (derived from the high concentration stream after passage over the membrane) at the injection pressure, an increased concentration output stream (derived from the low concentration stream after passage over the membrane) and electricity. It may be that the entire reduced concentration output stream is injected into the mineral formation. It may be that the reduced concentration output stream injected is the portion of the reduced concentration output stream that has passed through the power generation device.

The outputs from the osmotic power generation step may also include an additional reduced concentration output stream being the second fraction of the reduced concentration output stream that has passed through a pressure exchanger in the osmotic power unit. The additional reduced concentration output stream may be sent for further processing.

It may be that after passage through the pressure exchanger the total pressure of the second fraction of the reduced concentration output stream is increased to the injection pressure using a pump, before being combined with the first fraction of the reduced concentration output stream after passage through the power generation device. Thus, it may be that the reduced concentration output stream injected into the comprises the first and second fractions.

It may be that the increased concentration output stream is disposed of by discharge into a neighbouring body of water, for example a sea, river or lake, or into different formation to the mineral formation. It may be that none of the increased concentration output stream in injected into the mineral formation.

The mineral formation may be underground. It will be understood that high concentration stream produced by solution mining may contain a wide variety of dissolved minerals. The mineral may be salt. Thus, the mineral formation may be a salt formation, for example a salt dome or rock salt formation. It will be understood that streams extracted from salt formations may contain a wide variety of dissolved salts and that "salt content" refers to total salt content. The exact nature of the salt(s) present in such streams is not important. Such streams may contain a preponderance of sodium chloride, potassium chloride, calcium chloride and/or potash (salts containing potassium in water-soluble form). Alternatively, it may be that the mineral is not a salt. It may be that the mineral formation is not a geothermal formation. It may be that the high concentration stream is not a warm stream, for example not a warm saline stream. It may be that the high concentration stream is a cool stream having a temperature of less than 45° C., for example less than 40° C., for example less than 35° C.

The concentration of the high concentration stream may be anything up to saturation. For salts, the salt content of the high concentration stream is at least 10% wt, preferably at least 15% wt, especially at least 20% wt.

As well as the high concentration stream originating from the mineral formation, the osmotic power generation stem requires a low concentration stream which is a stream having lower concentration of the mineral (solute) than the high concentration stream. This low concentration stream may be obtained from any source, but is typically sea water, fresh or brackish water obtained, for example, from a river, a lake or an aquifer, or waste water obtained from an industrial or municipal source, process condensate or condensate water from a power plant. Throughout this specification, unless the context requires otherwise, "low concentration" should be understood to include zero concentration.

It may be that the entire high concentration stream extracted from the mineral formation is passed to the osmotic power unit.

It may be that a first fraction of said high concentration stream is passed to the osmotic power unit and a second fraction of said high concentration stream is output from the process, for example as a high concentration output stream.

It may be that the high concentration output stream is used as an input to an industrial process. Thus, the solution mining process described herein may be used to extract minerals (for example salts or potash) for use in industry. Where the solution mining process is used for mineral extraction the high concentration output stream will typically be a saturated stream (this being beneficial for most industrial processes). In such a process the flow of the second fraction may be equal to the flow of the solvent across the semi-permeable membrane from the low concentration stream to the high concentration stream. This means that the volume of fluid within the system may remain constant, thereby allowing for continuous production. Saturation of the high concentration stream can be achieved by controlling the ratio between the flow of the second fraction and the flow of the solvent. Thus the process may comprise varying the amount of fluid output as the high concentration output stream and/or the flow of solvent across the membrane (for example by varying the parameters of the osmotic power generation step) to provide a high concentration stream at saturation.

Alternatively, it may be that the high concentration output stream is disposed of as appropriate, for example into a nearby watercourse for example a river, lake or sea. This may be the case where the present invention is being used to produce a cavern for the storage of fuel. In such cases it may be advantageous to have a lower concentration high concentration output stream, as disposal of such streams may be easier. This lower concentration can be achieved by varying the ratio of the flow of the second fraction to the flow of the solvent across the semi-permeable membrane from the low concentration stream to the high concentration stream. Increasing the flow of solvent will result in a lower concentration in the second fraction. Thus, the process may comprise varying the amount of fluid output as the high concentration output stream and/or the flow of solvent across the membrane (for example by varying the parameters of the osmotic power generation step) to provide a predetermined concentration in the high concentration output stream.

It may be that a second osmotic power unit is located upstream of the (first) osmotic power unit described above. The second osmotic power unit may have any of the features described above with reference to the first embodiment, except where such features are incompatible with the features of the second osmotic power unit described below.

It may be that the reduced concentration output stream from the second osmotic power unit is used as the high concentration stream in the first osmotic power unit. It may be that, in the second osmotic unit, the total pressure of the reduced concentration output stream is reduced by passage through a power generation device to the pressure of the high concentration stream on entry to the semi-permeable membrane of the first osmotic power unit.

Use of multiple osmotic power units in this way may allow optimisation of the process to increase the efficiency of the process, for example by allowing different units to operate at different pressures and/or with different membranes.

The osmotic power generation process is powered by osmosis, and converts latent osmotic energy into electricity. An osmotic power unit is a unit which converts latent osmotic energy into electricity. Any suitable osmotic power unit may be used in the process of the present invention. The key feature of such a unit is the presence of a semi-permeable membrane which permits the passage of water but not of dissolved salt(s). Such membranes are commercially available, and any suitable membrane may be used. More than one membrane may be present, and combinations of different types of membranes may be used. Thus the osmotic power unit may contain more than one osmosis unit, each osmosis unit containing a semi-permeable membrane. As well as at least one membrane, an osmotic power unit will include means for converting pressure or flow generated by osmosis into electricity. Typically this means will be a turbine connected to a generator, but any suitable means may be used.

After passage over a membrane, the first stream (initial higher concentration) will be reduced in concentration, while the second stream (initial lower concentration) will be increased in concentration. The output streams from a first pass over the membrane will both have lower concentration than the original high concentration stream, and higher concentration than the original low concentration stream— at equilibrium, the two streams would have equal salinity, but this is unlikely to be achieved in practice. Therefore, either output stream can be reused as either the first stream or the second stream for a second pass over the original membrane, or as either the first stream or the second stream over a second membrane. These reused streams may be used alone, or merged with other input streams. The high concentrations of minerals in streams extracted from mineral formations may facilitate the use of multi-step osmotic power generation. Each step may have a different pressure and/or flux setting depending on the difference in salinity between the initial input streams for each pass. Tailoring the pressure and/or flux setting in this manner may increase the efficiency of the process. As long as an outgoing stream from an osmosis unit has higher concentration than the initial input stream of lower concentration, it is possible to operate an additional osmosis unit. The optimal number of cycles will depend on the initial content of the streams, the efficiency of the membranes, and the flow rates selected.

The osmotic power unit may contain more than one osmosis unit, each osmosis unit comprising a semipermeable membrane which permits the passage of solvent (for example water) but not the passage of minerals. The output from each osmosis unit will be a first outgoing stream from a first (initial higher concentration) side of the membrane and a second outgoing stream from a second (initial lower concentration) side of the membrane. These streams may be handled separately or at least partially merged.

At least one output stream (a reduced concentration output stream) from the osmotic power unit will be derived from the original high concentration stream. This stream may have higher salinity than the low concentration stream but a lower concentration than the high concentration stream and is capable of dissolving salt from the salt formation. This stream is used as the unsaturated stream that is injected into the mineral formation.

It will be appreciated that the steps of injecting the unsaturated stream, extracting the high concentration stream, converting latent osmotic energy, generating electricity and reducing pressure are carried out simultaneously.

According to a second aspect of the invention there is provided a process for storing a fuel in an underground formation, the process comprising creating and/or maintaining a void in a mineral formation using the process of the first aspect, and injecting the fuel therein for storage. Using the osmotic solution mining process to produce a fuel storage system may reduce the energy requirement (and therefore cost) associated with underground storage of fuels.

It may be that the fuel is hydrogen, biogas, natural gas, methanol and/or ammonia, for example in liquid or gaseous form.

It may be that fuel is stored in the underground formation for a period of more than a week, for example more than a month, for example for several months.

According to a third aspect of the invention there is provided a solution mining system comprising one or more of the following:

a hydraulic system suitable for connection to a mineral formation, said hydraulic system being arranged to inject an unsaturated stream into the mineral formation at an injection pressure and extract a high concentration stream from the mineral formation; and/or an osmotic power unit arranged to generate electricity through Pressure Retarded Osmosis (PRO), using the difference in concentration between the high concentration stream and a low concentration stream, the osmotic power unit being configured to reduce the total pressure of a reduced concentration output stream derived from the high concentration stream after passage through the osmotic power unit to the injection pressure; and wherein the system is arranged such that the reduced concentration output stream is passed to the hydraulic system for use as the unsaturated stream.

At least part of the solution mining system, for example the osmotic power unit and/or the hydraulic system, may be mounted on a mobile platform, for example a road vehicle for example a truck, heavy goods vehicle (HGV) or similar vehicle or a trailer for use with such a vehicle. Mounting a solution mining system comprising the osmotic power unit and/or the hydraulic system on a mobile platform may facilitate solution mining in locations where power supply is limited. The process of the invention may comprise moving the power generation system mounted on the mobile platform to a first location having an underground mineral formation. The process may comprise carrying out the method of the invention at the first location. The process may comprise moving the power generation system mounted on the mobile platform to a second, different, location, having an underground mineral formation, and carrying out the method of the invention at the second location.

The solution mining system may comprise one or more pumps and a control system along with other conventional means for carrying out the solution mining process. At least part of the solution mining system, for example one or more pumps and/or the control system may be mounted on the mobile platform.

In the case that the mineral formation is an underground mineral formation, the osmotic power unit may be located above ground. The osmotic power unit may be located on, for example mounted on, a mobile platform.

It will be understood that the process of the present invention may be described as an electricity generation process because the osmotic power unit produces electricity. It will be appreciated that the amount of electricity produced will vary depending on the process parameters. The osmotic power unit may provide enough electricity to power the solution-mining process and provide a surplus for use elsewhere, or just enough electricity to power the solution-mining process, or an external supply of power in addition to that provided by the osmotic power unit may be required to run the solution-mining process.

The osmotic power unit may comprise a housing. The osmotic power unit may comprise an inlet, for example in the housing, via which the high concentration stream enters the osmotic power unit. The osmotic power unit may comprise an outlet, for example in the housing, via which the reduced concentration output stream exits the osmotic power unit. The total pressure of the high concentration stream immediately upstream of the inlet may be less than the total pressure of the reduced concentration stream immediately downstream of the outlet. The total pressure of the reduced concentration output stream at the outlet may be equal to the injection pressure. The osmotic power unit may comprise an outlet, for example in the housing, via which the additional reduced concentration output stream exits the osmotic power unit.

The system may be configured such that a first fraction of said high concentration stream is passed to the osmotic power unit and a second fraction of said high concentration stream is output from the system as a high concentration output stream. The system, for example the hydraulic system, may comprise an outlet via which the second fraction exits the system.

The hydraulic system may comprise an injection well, via which the unsaturated stream is injected to the mineral formation. The total pressure of the unsaturated stream at the head of the well may be the injection pressure.

The osmotic power unit may comprise a pressure exchanger, pump for the high concentration stream, pump for the low concentration stream and/or power generation device as described above.

According to a fourth aspect of the invention there is provided a process for solution mining of minerals, the process comprising:
  injecting an unsaturated stream into a mineral formation to dissolve the mineral contained therein, and then extracting a high concentration stream containing said dissolved mineral from the mineral formation;
  converting latent osmotic energy present in said high concentration stream into an increase in the total pressure of said stream by passage through an osmosis unit comprising a semi-permeable membrane which permits the passage of solvent but not the passage of the mineral, and in which the high concentration stream is passed over one side of the semi-permeable membrane, a low concentration stream being passed over the other side of said membrane;
  generating electricity and reducing the total pressure of a reduced concentration output stream derived from the high concentration stream after passage over the membrane by passing the reduced concentration output stream through a power generation device;
  injecting the reduced concentration output stream into the mineral formation for use as the unsaturated stream; and
  wherein a first fraction of said high concentration stream is passed to the osmosis unit and a second fraction of said high concentration stream is output from the process, for example as a high concentration output stream.

The process of the fourth aspect may have any of the features described above in connection with the first, second or third aspects. The process of the third aspect may find particular application when the purpose of the solution mining is to produce high concentration streams from mineral formations for use in industry. For example in when the high concentration stream is to be used in an electrolysis process.

In a further aspect of the invention there is provided a method to use a Pressure Retarded Osmosis (PRO) system within a mining process of a substance concentration of minerals (a solution mining process), said method including for a suitable low concentration solution to be pumped under low pressure to a first side of a semi-permeable membrane of said osmotic power system and where a high concentration solution from said substance concentration with a first fraction is directed to the second side of said membrane, where by diffusion over the semi-permeable membrane substances from the low concentration solution mixes with said first fraction high concentration solution forming a diluted solution (e.g. a reduced concentration output stream) that is returned to the substance concentration (e.g. as the unsaturated stream), where a second fraction of said high concentration solution is directed to further processing.

It may be that the first fraction high concentration solution is pressurized in a pressure exchanger at a pressure below the difference in osmotic pressure between the high concentration and the low concentration solution increasing the volume of the diluted solution.

It may be that the first fraction high concentration solution is being pressurized in a high pressure pump prior to being directed to said semipermeable membrane.

It may be that part of the dilute solution is directed to a pressure exchanger to pressurize the incoming first fraction high concentration solution.

It may be that the increased volume of the diluted solution is directed into the substance concentration.

It may be that the increased volume of the diluted solution is directed to a power generating device.

It may be that said method comprises operating on a system consisting of at least two stages (A, B), where the low concentration solution coming from the prior stage A (the second osmotic power unit) is used as the high concentration solution for the subsequent stage B (the first osmotic power unit). It may be that the dilute solution is first used for power generation in the prior stage A, after which it is pressurized with a high pressure pump at the injection pressure and send to the membrane in the subsequent stage B. It may be that a high pressure pump is used to pressurize the incoming high concentration solution to the prior stage A, which after passing through the membrane is directed a power generating device such as a turbine.

It may be that said method includes circulate a fluid between an osmotic power system and a substance concentration under the osmotic forces generated by minerals in said substance concentration directed to the osmotic power system by said fluid.

In a further aspect of the invention there is provided a system to use an osmotic power system to extract minerals from a substance concentration, said system comprising flow paths to circulate a fluid between said osmotic power system and said substance concentration using the osmotic forces generated in said osmotic power system, where a high concentration solution is directed from substance concentration with a said first fraction to a second side of a semi-permeable membrane of said osmotic power system and a second fraction to further processing, said high concentration solution formed within said substance concentration when a diluted solution is recirculated thereto from the osmotic power system, said diluted solution formed in said osmotic power system from a low concentration solution being pumped to said a first side of said semi-permeable membrane with a low pressure pump. The system may further comprise the means to operate according to the methods according to any of the immediately previous aspect.

It may be that the substance concentration is a subsurface mineral ore.

It may be that the further processing is for producing power, such as a process for generating power from a warm saline steam obtained from geothermal sources.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
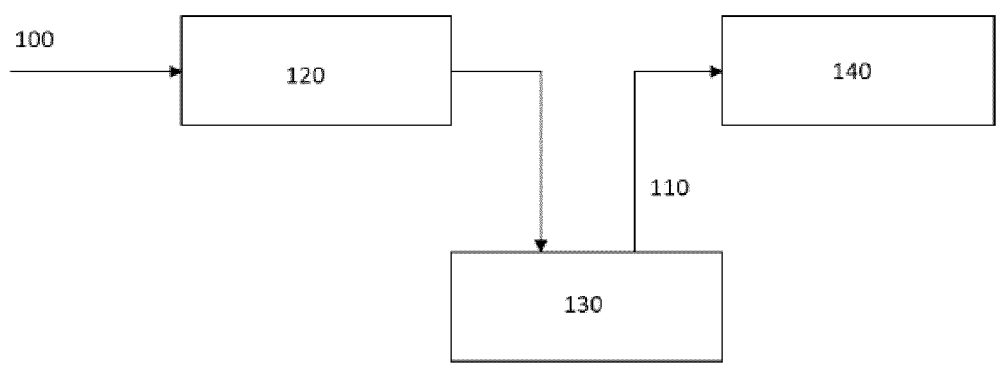
FIG. 1 shows an example solution mining process (falling outside the scope of the present invention)

FIG. 1 schematically illustrates a typical solution mining process (one not in accordance with the present invention), where a suitable low concentration solution 100 is injected using a pump 120 to a subsurface mineral formation 130 such as a subsurface mineral ore to create a high concentration solution 110 that is sent to further processing 140. The mineral ore may comprise sugar or salts for example sodium chloride, potassium chloride, calcium chloride or other salts.

Because the density increases as minerals dissolve in the low concentration solution 100, pumping energy is required to lift solution with a mass equal to the density difference from the formation to the surface. If the density difference is 200 kg/m$^3$ and the solution is extracted from a depth of 2 km, an injection pressure of about 39 bar is required (not including pressure losses in the system).

Figure 2:
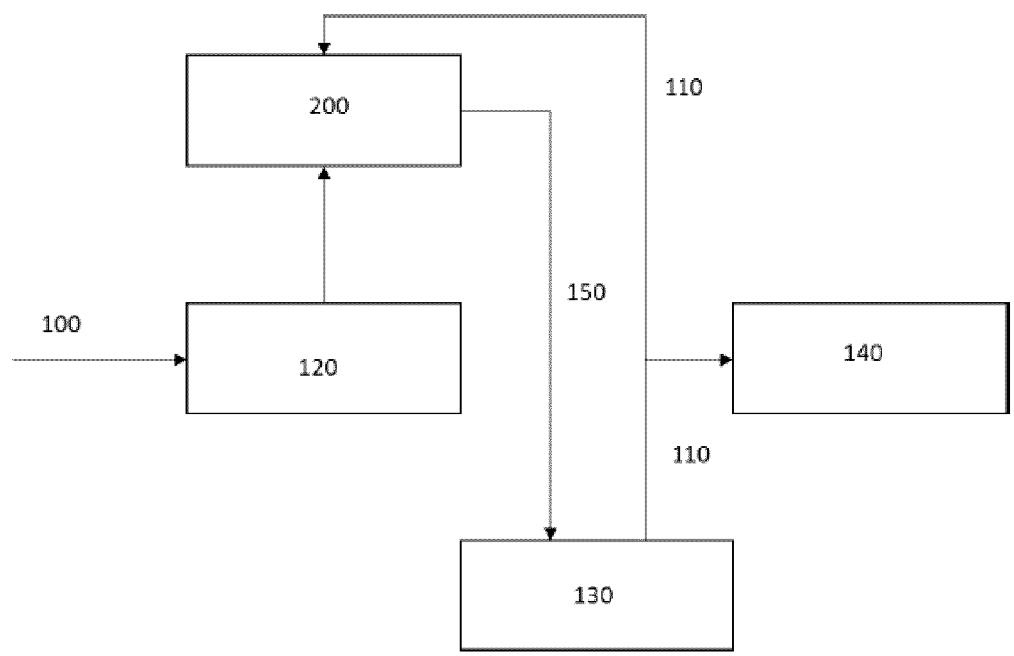
FIG. 2 shows a first example solution mining process in accordance with the present invention.

FIG. 2 shows an example solution mining process in accordance with the invention in which a surplus of high concentration solution 110 is extracted from the substance concentration 130 and recirculated between the mineral formation 130 and a suitable PRO system 200, the remaining high concentration solution 110 is sent for further processing 140. A low concentration solution 100 is fed by a feed pump 120 under low pressure to the PRO system 200 where it mixes with high concentration solution 110 to produce a dilute solution 150. The entire dilute solution 150 mixture is injected into the mineral formation 130 to dissolve additional minerals. The extracted volume of high concentration solution 110 and the reinjected dilute solution 150 must be of equal volume to maintain a constant volume in the mineral formation 150. In this way, the mixing of the low concentration solution 100 and the high concentration solution 110, is moved from taking place in the mineral formation 130 to the osmotic power system 200, where the energy can be harvested, allowing the extraction to be driven by the spontaneous mixing of low concentration 100 and high concentration solutions 110.

Figure 3:
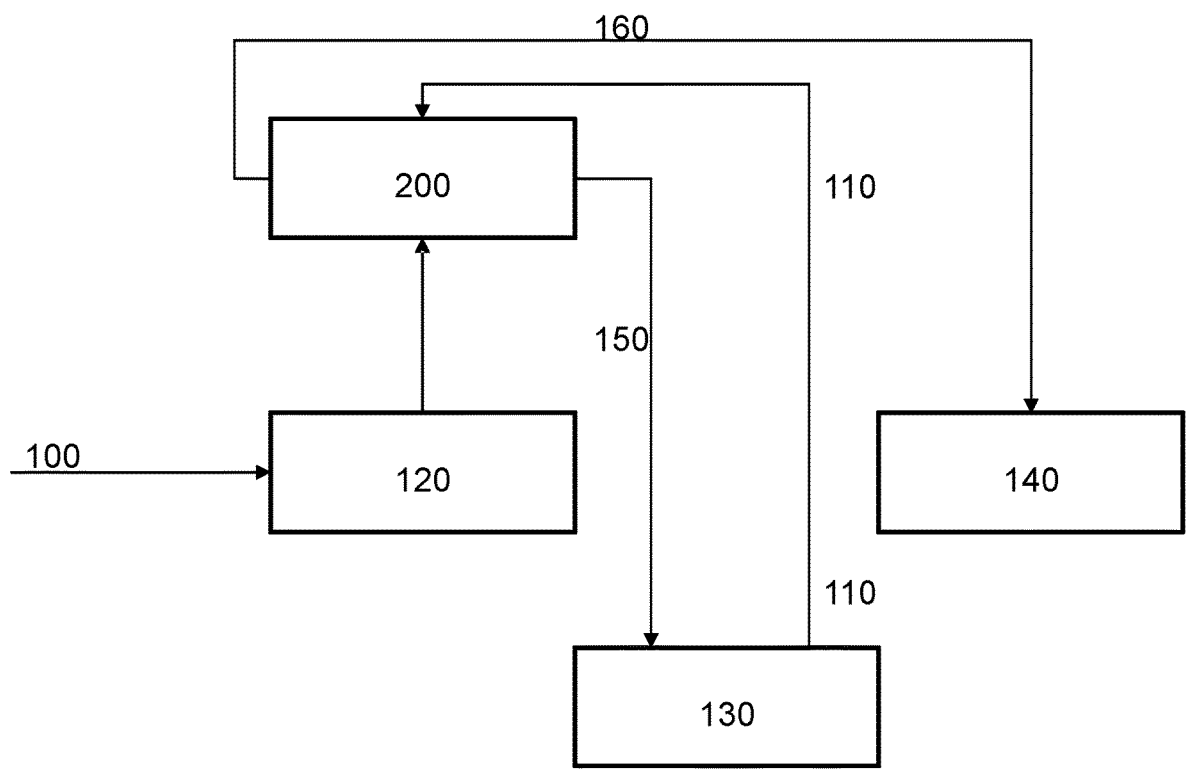
FIG. 3 shows a second example solution mining process in accordance with the present invention.

FIG. 3 shows a variation of the process shown in FIG. 2. Here the entire volume of high concentration solution 110 extracted from the formation 130 is sent to the PRO system 200, where it mixes with low concentration solution 100. Part of the resulting dilute solution 150 is sent back the formation 130, while the remaining part of the dilute solution 160 is sent for further processing 140. In this setup the dilute stream 160 sent for further processing 140 will be lower in concentration than the extracted high concentration stream 110. This version of the invention is thus useful for scenarios where the further processing does not rely on and prefers lower concentrations. An example could be discharge of dilute formation water as part of excavation of a cavern for gas or other storage, where disposal of water with high concentrations of minerals may be difficult. It is possible to obtain the same end result from the layout given in FIG. 2 but this requires the further processing step to comprise of an additional osmotic power unit. In the layout in FIG. 3, this can be accomplished in one system using fewer components.

Figure 4:
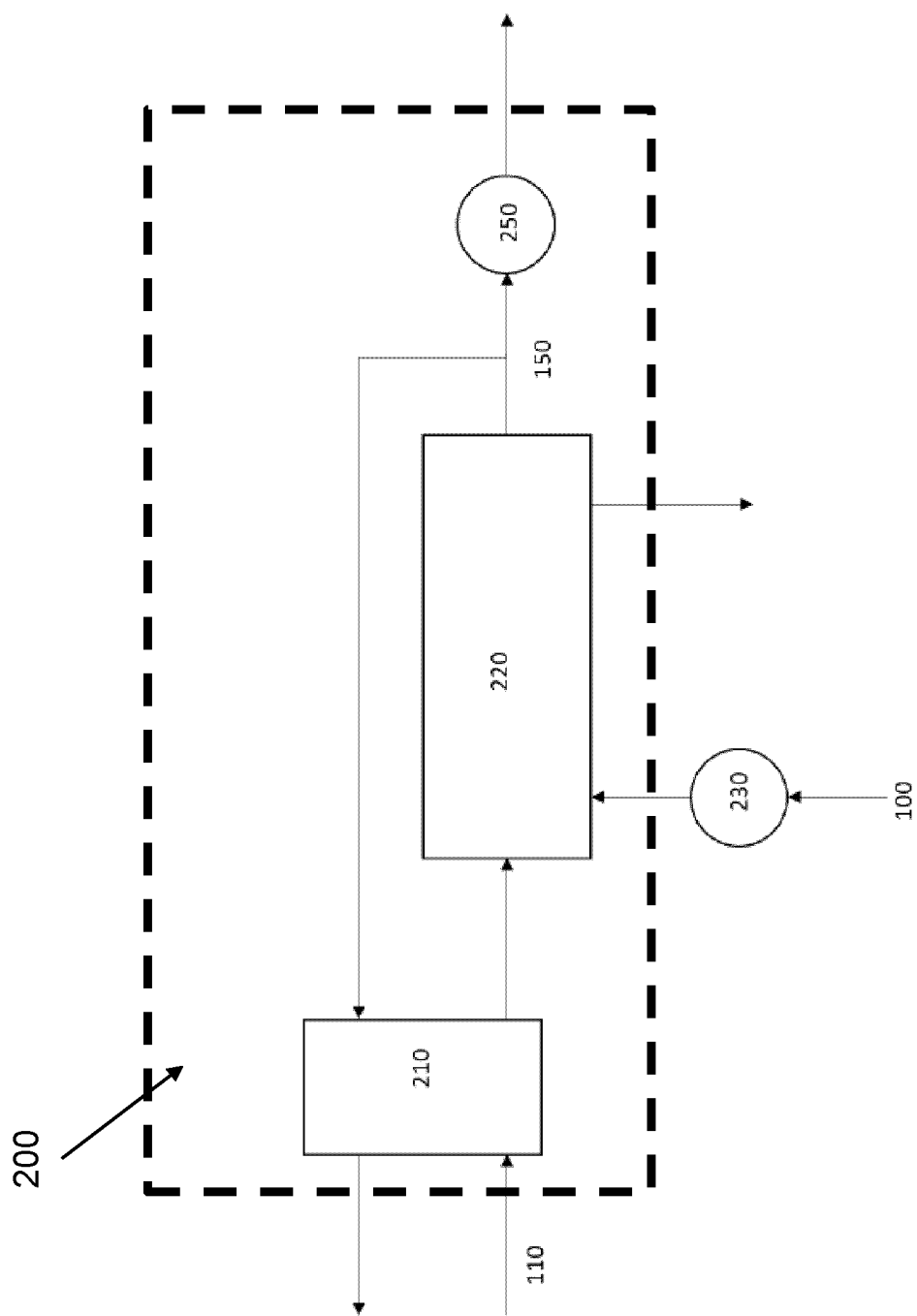
FIG. 4 shows more detail of an osmotic power unit for use in the processes of FIG. 2 or 3.

FIG. 4 shows an example PRO type osmotic power unit 200, suitable for use in the systems of FIG. 2 or 3. The high concentration solution 110 is pressurized in a pressure exchanger 210 (e.g. a heat exchanger, a rotary pressure exchanger etc.) at a pressure below the difference in osmotic pressure between the high concentration 110 and the low concentration 100 solutions. The pressurized high concentration solution is then sent to one side of a semi-permeable membrane 220, while the low concentration solution 100 is sent to the other side of the membrane 220. The low concentration solution is pressurized using a feed pump 230 prior to being sent to the membrane 220. Due to the difference in osmotic pressure, solvent will spontaneously move from the low concentration side to the high concentration side to equalize the chemical potential across the membrane 220. This creates a dilute solution 150 the total pressure of which is higher than the total pressure of the high concentration stream 110 on input to the semi-permeable membrane 220. A first fraction of this dilute solution 150 is directed to a power generating device 250 such as a turbine to produce electricity. A second part of the dilute solution 150 is passed to the pressure exchanger 210 where pressure from the dilute solution 150 is transferred to the high concentration solution 110.

Passage through the power generating device 250 reduces the total pressure of the first fraction of the dilute solution 150 to the injection pressure. The dilute solution 150 can then be passed to the mineral formation 130 without the need for any additional mechanical pumping. This may provide a particularly efficient solution mining process, in particular in comparison to those in which the dilute solution 150 is pressurized using a pump driven using electricity generated in the osmotic power unit 200.

In some embodiments the second fraction of dilute solution 150 output from the pressure exchanger 210 is not reinjected into the mineral formation 130. In the process of FIG. 2, it may be combined with the high concentration solution 110 sent for further processing 140 or disposed of as appropriate, for example into a nearby watercourse. In the process of FIG. 3, the second fraction of dilute solution 150 may be sent for further processing as stream 160.

In some embodiments, the entire stream 110 going to the pressure exchanger 210 is reinjected into the formation 130. In this case the second fraction of dilute solution 150 output from the pressure exchanger 210 and first fraction of dilute solution 150 output from the power generation device 250 must be combined and reinjected. A pump (not shown) is used to pressurize the second fraction after passage through the pressure exchanger 210 to the injection pressure before it is recombined with the first fraction (which is at the injection pressure already).

In some embodiments the pressure exchanger is absent. In the same or yet further embodiments a pump is used to pressurize the high concentration solution 110 prior to passing over the membrane 220. This makes all the pressurized dilute solution 150 available for passing through the power generation device 250 (by which passage the pressure of the dilute solution 150 is reduced to the injection pressure) and thereby allows the entire dilute solution 150 to be sent directly for injection.

Only the high concentration solution 110 must be pressurized at the high pressure (>30 bar) required for injection, whereas the low concentration solution 100 can be pumped to the membrane using a low pressure (<15 bar). Power is needed to drive the pump or pressure exchanger for the high concentration solution 110 and the low pressure pump 230 for the low concentration solution 100, and by operating the PRO process at a pressure higher than the injection pressure, the power generating device can utilize the pressure gradient for energy generation (to power the high pressure pump and the low pressure pump) while the diluted solution 150 can be sent directly for injection.

Figure 5:
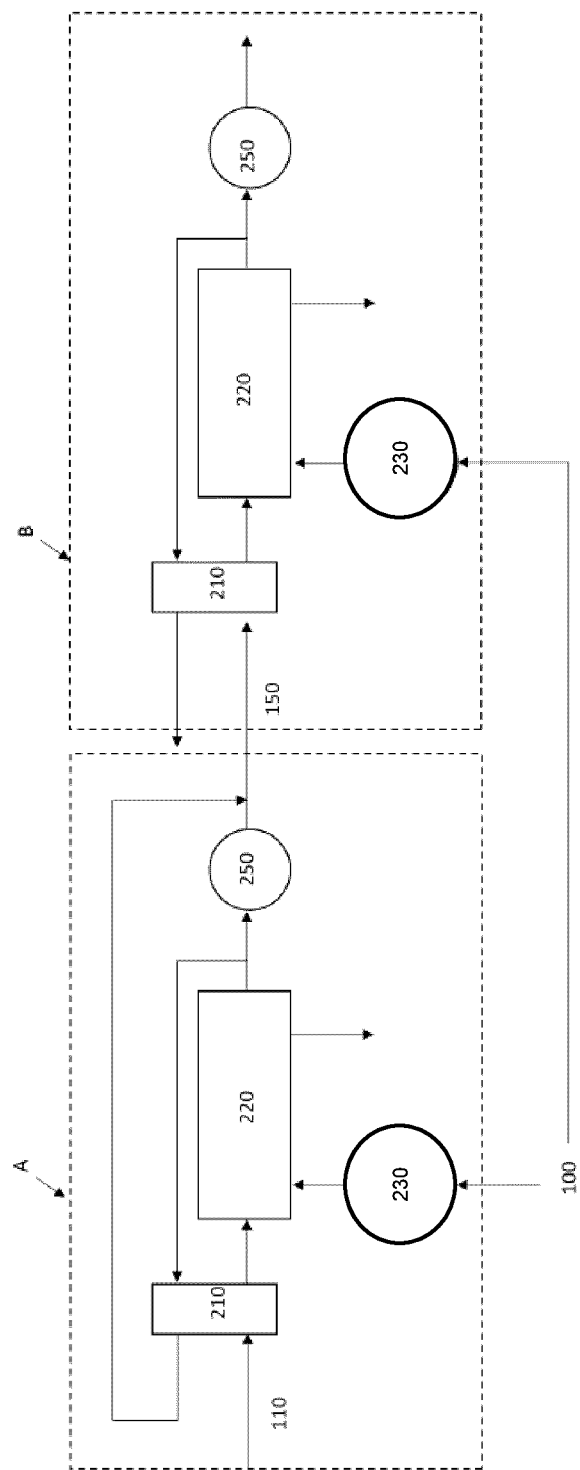
FIG. 5 shows part of a third example solution mining process in accordance with the present invention, being a variation on the processes of FIG. 2 or 3.

It is also possible to use several osmotic power units 200 in combination to enhance the efficiency of the process. FIG. 5 comprises an example of such a system which comprises two osmotic power units (A, B) (though the system could include any number of stages (A, B) in succession of each other) of the type shown in FIG. 4. The dilute solution 150 coming from the prior stage A is used as the high concentration solution 110 for the subsequent stage B. The dilute solution 150 from the subsequent stage B passes through the power generation system 250 to have a pressure on exit equal to the injection pressure. The dilute solution is then reinjected into the mineral formation 130. The two stages A, B can operate at different pressures, with the pressure in the prior stage A being higher than in the subsequent stage B. To maximize energy generation, it is desirable to operate the PRO process at high pressures, but as the pressure is increased, the degree of dilution of the dilute solution 150 that can be obtained is lowered because the osmotic pressure difference decreases as solvent crosses the membrane 220. Operating with dual stages as illustrated thus allows for a greater energy generation and dilution to lower concentrations. This may mean that less additional brine (high concentration solution 110) needs to be extracted from the substance concentration 130 to run the PRO process.

In a variation of the process of FIG. 5, the pressure exchanger 210 is omitted from both stages A, B. Instead, the high concentration solution 110 is pressurized using a pump and then passes over the membrane 220 in prior stage A to produce dilute solution 150. After passage through the power generation device 250 of prior stage A the dilute solution 150 is used as the high concentration solution 110 of subsequent stage B. In some embodiments, passage through power generation device 250 of prior stage A reduces the pressure of dilute solution 150 to the operating pressure for the membrane 220 of subsequent stage B. That is to say, the dilute solution from prior stage A can be passed directly to the membrane of subsequent stage B without the need for any pumping and thereby removing the need for any additional pump. In this way, there is no need for an additional pump or pressure exchanger to pressurize the solution before it enters the subsequent stage B membrane 220.

Figure 6:
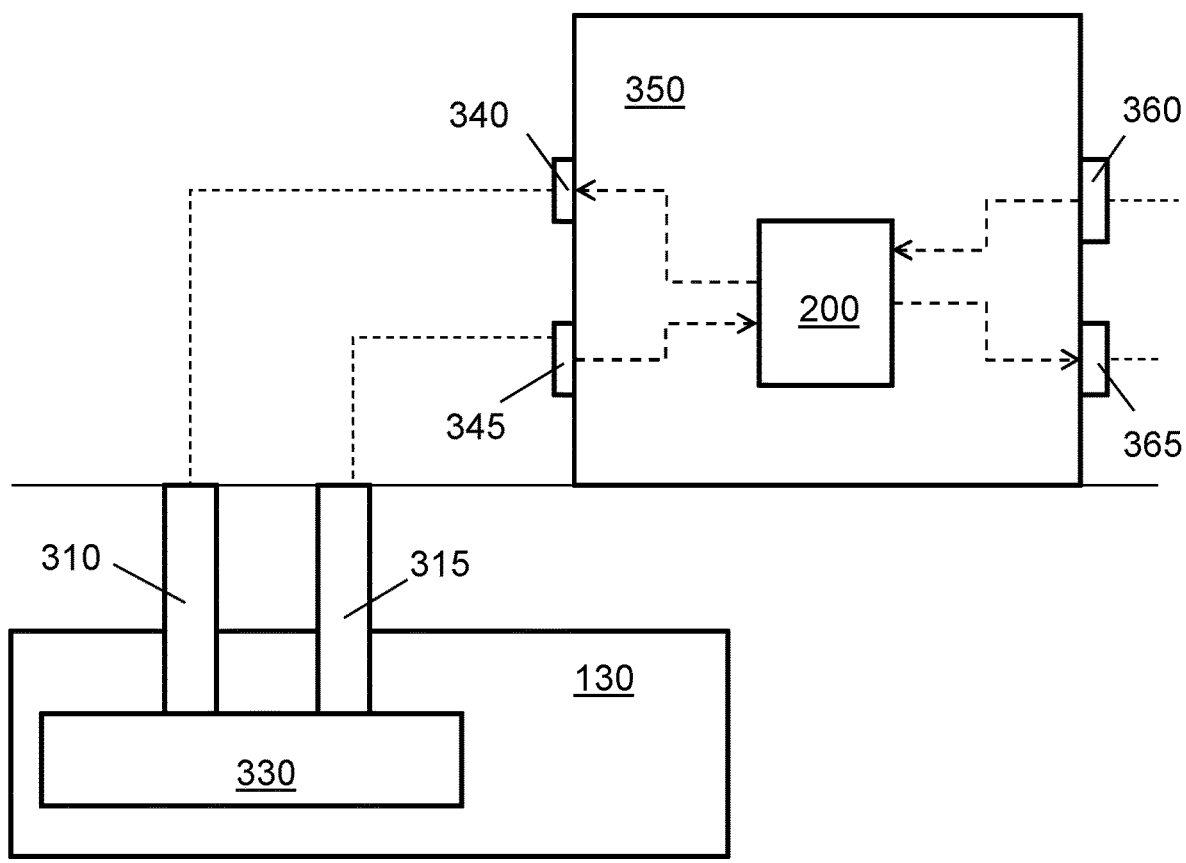
FIG. 6 shows an example apparatus in accordance with the present invention.

FIG. 6 shows a schematic diagram of a mobile production unit 350 for use with a salt formation 130. Injection well 310 and extraction well 315 extend from the surface to a salt cavern 330 located within the salt formation 130. An outflow port 340 of production unit 300 is connected to injection well 310 and an inflow port 345 connected to extraction well 315 (these connections being shown with dashed lines in FIG. 6). The mobile unit 350 comprises an osmotic power unit 200, a control system (not shown) and other elements of a solution mining system not shown here for clarity. The mobile unit 350 further comprises an inflow port 360 and output flow port 365, both connected to a water source (not shown). Within mobile unit 350 a hydraulic system connects the osmotic power unit 200 to the various ports as follows (shown by dashed lines in FIG. 6); inflow port 360 is connected to the low-salinity input of the osmotic power unit, outflow port 365 with the waste (low-salinity) output of osmotic power unit 200, outflow port 340 with the osmotic power unit output for the stream derived from the high-salinity input, and inflow port 345 with the high-salinity input of osmotic power unit 200. The total pressure of the osmotic power unit output for the stream derived from the high-salinity input is substantially equal (barring minor pipe flow losses etc.) to the total pressure of the stream at the outflow port 340 and the head of the injection well 310. Accordingly, there is no pump situated between the output from the osmotic power unit 200 and the head of the injection well 310. A portion (not shown) of the high-salinity stream from extraction well 315 is split off upstream of the mobile production unit 350 and sent for further processing, for example use in an industrial process. Once the cavern 330 has been excavated fuel, for example hydrogen, biogas, natural gas, methanol and/or ammonia, may be pumped into the cavern for storage.

In a variation of the process shown in FIG. 6, the entire high-salinity stream from extraction well 315 is sent to the osmotic power unit 200 and part of the stream derived from the high-salinity input after passage through the osmotic power unit 200 can be discharged through outflow port 365 with the waste stream. In this way the volumetric balance in the cavern 330 can be maintained.

It will be appreciated that the apparatus of FIG. 6 can be used with other minerals in place of salt.

The impact of the present invention on the efficiency of the solution mining process can be seen in the consideration of the following systems (all of which produce 100 m3 saturated brine per hour).

A traditional solution mining process uses an injection pump to pressurize the fluid for injection into the salt formation. As shown below, such a process requires an energy input of 163 kW/hour to operate.

| Process | | Injection pump | Total |
| --- | --- | --- | --- |
| Flow | m³/h | 103.09 | |
| Pressure | bar | 40 | |
| Efficiency | | 0.7 | |
| Energy | kW | −163 | −163 |

The energy requirements for a solution mining process that uses electricity from an osmotic power unit including a turbine to power an injection pump that pressurizes the fluid for injection into the salt formation is shown below. The feed and draw pumps are used to pressurize the low and high concentration flows respectively prior to passage over the semi-permeable membrane, use of such pumps increasing the efficiency of the osmotic power unit and balancing the flow either side of the membrane. The ERD is an energy recovery device that transfers pressure from the reduced concentration output stream to the high concentration input stream. It is fed by the draw pump. In the example process below the injection pump that returns all diluted saltwater to the salt formation. Such a process requires an energy input of 43 kW/hour to operate.

| Process | | Feed pump | Draw pump | ERD | Turbine | Injection pump | Total |
|---|---|---|---|---|---|---|---|
| Flow | m³/h | 129 | 62 | 62 | 102 | 165 | |
| Pressure | bar | 8.9 | 2 | 80 | 80 | 24.5 | |
| Efficiency | | 0.7 | 0.63 | 0.95 | 0.84 | 0.7 | |
| Energy | kW | −47.5 | −5.7 | −8.3 | 185.5 | −167 | −43 |

The energy requirements for an example process in accordance with the present invention is shown below. No injection pump is needed as the turbine lowers the pressure to the injection pressure. Again, all the diluted saltwater is returned to the salt formation. Such a process requires an energy input of 4 kW/hour to operate. Further, this efficiency may be achieved without a pressure exchanger, thereby reducing the number of components required in the system.

| Process | | Feed pump | Draw pump | Turbine | Injection pump | Total |
|---|---|---|---|---|---|---|
| Flow | m³/h | 129 | 63.5 | 167 | — | |
| Pressure | bar | 9.2 | 80 | 24.2 | — | |
| Efficiency | | 0.7 | 0.9 | 0.84 | 0.7 | |
| Energy | kW | −49 | −163 | 208 | 0 | −4 |

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A process for solution mining of minerals, the process comprising:
   injecting an unsaturated stream at an injection pressure into a mineral formation to dissolve a mineral contained therein, and then extracting a high concentration stream containing said dissolved mineral from the mineral formation;
   converting latent osmotic energy present in said high concentration stream into an increase in a total pressure of said high concentration stream by passage through an osmotic power unit comprising a semi-permeable membrane which permits a passage of solvent but not a passage of the mineral, and in which the high concentration stream is passed over a first side of the semi-permeable membrane, a low concentration stream being passed over a second side of said semi-permeable membrane;
   generating electricity and reducing a total pressure of a reduced concentration output stream to the injection pressure by passing the reduced concentration output stream through a power generating device, the reduced concentration output stream being derived from the high concentration stream after passage over the semi-permeable membrane; and
   using the reduced concentration output stream at the injection pressure as the unsaturated stream injected into the mineral formation.

2. A process according to claim 1, wherein a first fraction of said high concentration stream is passed to the osmotic power unit and a second fraction of said high concentration stream is output from the process.

3. A process according to claim 1, wherein the entire high concentration stream extracted from the mineral formation is passed to the osmotic power unit.

4. A process according to claim 1, wherein a first fraction of the reduced concentration output stream is passed to the power generation device and a second fraction of the reduced concentration output stream is passed to a pressure exchanger in which pressure from the second fraction is transferred to the high concentration stream prior to passage of the high concentration stream over the semi-permeable membrane.

5. A process according to claim 4, wherein after passage through the pressure exchanger the second fraction of the reduced concentration output stream is output from the process.

6. A process according to claim 4, wherein after passage through the pressure exchanger the pressure of the second fraction of the reduced concentration output stream is increased to the injection pressure using a pump, before being combined with the first fraction of the reduced concentration output stream after passage through the power generation device to produce the reduced concentration output stream at the injection pressure.

7. A process according to claim 1, wherein the high concentration stream is pressurised in the osmotic power unit using a pump before passage over the semi-permeable membrane.

8. A process according to claim 1, in which the high concentration stream is passed to a second osmotic power unit, a reduced concentration output stream of the second osmotic power unit being passed to the osmotic power unit for use as the high concentration stream, and wherein a total pressure of the reduced concentration output stream of the second osmotic power unit is equal to the total pressure of the high concentration input stream on entry to the semi-permeable membrane.

9. A process according to claim 1, wherein the power generation device comprises a turbine.

10. A process according to claim 1, wherein the mineral formation is a salt formation.

11. A process for storing a fuel in an underground formation, the process comprising creating and/or maintaining a void in a mineral formation using the process of claim 1, and injecting the fuel therein for storage.

12. A process according to claim 11, wherein the fuel comprises hydrogen, biogas, natural gas, methanol and/or ammonia.

13. A process according to claim 11, wherein the fuel is in liquid or gaseous form.

14. A solution mining system comprising
   a hydraulic system suitable for connection to a mineral formation, said hydraulic system being arranged to inject an unsaturated stream into the mineral formation at an injection pressure and extract a high concentration stream from the mineral formation;

an osmotic power unit arranged to generate electricity through Pressure Retarded Osmosis (PRO), using a difference in concentration between the high concentration stream and a low concentration stream, the osmotic power unit being configured to reduce a total pressure of a reduced concentration output stream derived from the high concentration stream after passage through the osmotic power unit to the injection pressure; and wherein the system is arranged such that the reduced concentration output stream is passed to the hydraulic system for use as the unsaturated stream.

15. A solution mining system according to claim 14, wherein the osmotic power unit and/or the hydraulic system are mounted on a mobile platform.

16. A solution mining system according to claim 14, the system being configured such that a first fraction of said high concentration stream is passed to the osmotic power unit and a second fraction of said high concentration stream is output from the system as a high concentration output stream.

17. A process for solution mining of minerals, the process comprising:

injecting an unsaturated stream into a mineral formation to dissolve the mineral contained therein, and then extracting a high concentration stream containing said dissolved mineral from the mineral formation;

converting latent osmotic energy present in said high concentration stream into an increase in a total pressure of said high concentration stream by passage through an osmosis unit comprising a semi-permeable membrane which permits a passage of solvent but not a passage of the mineral, and in which the high concentration stream is passed over one side of the semi-permeable membrane, a low concentration stream being passed over another side of said semi-permeable membrane;

generating electricity and reducing the total pressure of a reduced concentration output stream derived from the high concentration stream after passage over the semi-permeable membrane by passing the reduced concentration output stream through a power generation device;

injecting the reduced concentration output stream into the mineral formation for use as the unsaturated stream; and wherein a first fraction of said high concentration stream is passed to the osmosis unit and a second fraction of said high concentration stream is output from the process as a high concentration output stream or other suitable streams.

\* \* \* \* \*